(12) United States Patent
Herle et al.

(10) Patent No.: US 7,673,300 B2
(45) Date of Patent: Mar. 2, 2010

(54) SEGMENTED LINKER USING SPATIAL LOCALITY OF REFERENCE FOR OVER-THE-AIR SOFTWARE UPDATES

(75) Inventors: Sudhindra P. Herle, Plano, TX (US); Vani Budhati, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1331 days.

(21) Appl. No.: 11/125,663

(22) Filed: May 10, 2005

(65) Prior Publication Data

US 2005/0278715 A1    Dec. 15, 2005

Related U.S. Application Data

(60) Provisional application No. 60/578,684, filed on Jun. 10, 2004, provisional application No. 60/578,685, filed on Jun. 10, 2004.

(51) Int. Cl.
 *G06F 9/445* (2006.01)
(52) U.S. Cl. .................... 717/169; 717/170; 717/171

(58) Field of Classification Search .................. None
See application file for complete search history.

(56) References Cited

U.S. PATENT DOCUMENTS

| | | | |
|---|---|---|---|
| 5,574,906 A | 11/1996 | Morris | |
| 6,671,700 B1 | 12/2003 | Creemer et al. | |
| 2003/0212712 A1* | 11/2003 | Gu et al. | 707/200 |
| 2004/0152455 A1* | 8/2004 | Herle | 455/418 |

\* cited by examiner

*Primary Examiner*—Chuck O Kendall (57) ABSTRACT

A segmented linker for generating from an original binary file an upgraded binary file suitable for replacing a copy of the original binary file installed in a target device. The segmented linker receives as inputs a plurality of objects, the original binary file, and a memory map input file associated with a target device. The segmented linker preserves in the upgraded binary file at least some of the spatial locality of reference of code in the original binary file. The segmented linker further receives as an input a linker guideline file that defines the layout of objects having spatial locality of reference in the original binary file. The segmented linker uses the linker guideline file to limit the propagation of cascading address references in the upgraded binary file.

16 Claims, 4 Drawing Sheets

SEGMENTED LINKER USING SPATIAL LOCALITY OF REFERENCE FOR OVER-THE-AIR SOFTWARE UPDATES

CROSS-REFERENCE TO RELATED APPLICATIONS AND CLAIM OF PRIORITY

The present invention is related to that disclosed in U.S. Provisional Patent No. 60/578,684, filed Jun. 10, 2004, entitled "Space Efficient Delta Generation for FOTA" and U.S. Provisional Patent No. 60/578,685, filed Jun. 10, 2004, entitled "Segmented Linker for FOTA". U.S. Provisional Patent Nos. 60/578,684 and 60/578,685 are assigned to the assignee of the present application. The subject matter disclosed in U.S. Provisional Patent Nos. 60/578,684 and 60/578,685 are hereby incorporated by reference into the present disclosure as if fully set forth herein. The present application hereby claims priority under 35 U.S.C. §119(e) to U.S. Provisional Patent Nos. 60/578,684 and 60/578,685.

CROSS-REFERENCE TO RELATED APPLICATION(S)

The present invention is related to that disclosed in U.S. patent application Ser. No. 10/600,056, entitled "Apparatus and Method for Performing a Fail-Safe Over-the-Air Software Update in a Mobile Station," filed on Jun. 20, 2003, and U.S. patent application Ser. No. 11/125,665, entitled "Apparatus and Method for Efficient Generation of Delta Files for Over-The-Air Upgrades in a Wireless Network," filed concurrently herewith. Patent application Ser. Nos. 10/600,056 are assigned to the assignee of the present application. The subject matter disclosed in patent application Ser. Nos. 10/600,056 is hereby incorporated by reference into the present disclosure as if fully set forth herein.

TECHNICAL FIELD OF THE INVENTION

The present invention relates generally to wireless communications and, more specifically, to technique for efficiently generating delta files for over-the-air upgrading of wireless mobile stations.

BACKGROUND OF THE INVENTION

Wireless service providers and wireless equipment manufacturers constantly seek new ways to make wireless equipment and services as convenient, user-friendly, and affordable as possible. One important aspect of these efforts involves over-the-air (OTA) upgrading of wireless mobile stations, such as cell phones, wireless personal digital assistants (PDAs), wireless hand-held computers, two-way pagers, and the like, as well as fixed wireless terminals. Over-the-air (OTA) upgrading, sometimes called firmware over-the-air (FOTA) upgrading, is a relatively new procedure that enables a mobile station user to download and install updated software containing patches, bug fixes, and newer versions of the software, including the operating system, stored in the wireless mobile station.

Software upgrades are usually delivered to a mobile station in the form of delta files. A mobile station contains a copy of an original (or old) file and it is desired to replace the original file with an upgraded (or new) file. However, many software programs and other files are quite large and delivering the entire upgraded file over the air is generally impractical, if not impossible. To overcome this problem, OTA upgrade operations often use delta files.

Delta files are generated by detecting the differences between the original file and the upgraded file. The detected differences are then used to create the delta file, which contains data and instructions that can be used to convert the original file to the upgraded file. When the delta file is delivered to the wireless mobile station, the instructions in the delta file are executed and the data from the delta file is used to modify (or patch) the original file, thereby converting the original file to the upgraded file in the mobile station. The advantage to this method is that the delta file is typically much smaller than either the original file or the upgraded file.

A number of method exist for generating delta files. However, each of these methods suffers from one or more significant drawbacks. A popular delta generation algorithm proposed by Reichenberger, also known as the "greedy" algorithm is very good at generating delta files that are theoretically the minimum possible size. However, the greedy algorithm is practically unusable for any file that is larger than 4 megabytes (4 Mb) in size, because of the time required to generate the delta file. The greedy algorithm requires $O(n^2)$ memory and runtime, where n is the combined length the old and new files. For large values of n, generating a delta file may require many hours or even days to complete.

Another popular delta generation algorithm is the xdelta introduced by Josh MacDonald. The xdelta algorithm runs in linear time, but the delta file size is much larger than the greedy delta algorithm. This is a problem for wireless applications, because may wireless service providers impose restrictions on delta file sizes. Furthermore, the delta-apply software (i.e., the "patch client") that runs on the mobile station will have erratic Flash memory sector-write patterns. This results in increased patch-apply times. Wireless service providers generally also impose strict limits on patch-apply times (e.g., less than 10 minutes). An additional problem with erratic Flash memory sector-write operations is the resulting wear-and-tear on the physical Flash memory part. As is well known, Flash memories have limited erase-write cycles (e.g., approx 10,000).

Finally, xdelta instructions assume that reconstruction of the upgraded file from the original file does not happen in place. The upgraded file is assumed to be separate and distinct from the old file. At the end of the reconstruction, the old file is deleted, leaving only the upgraded file. Thus, during the generation of the upgraded file, a Flash memory size of twice the image file sized is needed.

The vcdiff algorithm proposed by Kiem Phong Vo is another linear time algorithm, similar to the xdelta algorithm. As a result, the vcdiff algorithm suffers from drawbacks similar to the drawbacks affecting the xdelta algorithm. Finally, the rsync algorithm introduced by Andrew Tridgell is designed to minimize the amount of traffic exchanged between the client and the server. However, it does not optimize anything else. Thus, its use in firmware over-the-air (FOTA) applications is very limited.

The prior art algorithms for generating delta files are also handicapped by the manner in which conventional linker programs generate the original binary file and upgraded binary file from which the delta files are generated. A linker takes object files and produces an executable file. More particularly, the linker takes one or more object files, libraries, and address details as input from a memory map input file and produces an output file suitable for execution. However, in conventional linkers, the output executable is monolithic in nature. The output executable does not have a deterministic ordering of functions, variables, and the like. These details are left entirely up to the linker.

Current linkers do not have any order in choosing object files. Further more, the order in which read-write data ("RW data") is gathered is also undefined (i.e., random). Due to the unique nature of instruction sets such as the ARM microprocessor instruction set, branch instruction encoding, jump instruction encoding, and function call instruction encoding change when the address references for these instructions change. When new software modules are added or deleted from a file (due to a bug fix, etc.), the output executable will have changes to the jump, branch, and function call instructions.

These changes, in turn, cascade into other modules due to intra-module references. The cascading changes result in two binaries (an original binary file and an upgraded binary file) that are drastically different. This causes a great increase in the size of the delta file generated between the original binary file and the upgraded binary file. Thus, existing linkers not only fail to preserve spatial locality of reference in software code, existing linkers actually cascade changes. Thus, relatively small changes in software results in large changes in the output executable. These qualities are very bad for the generation of delta files for FOTA applications.

Therefore, there is a need in the art for an improved apparatus and method for generating delta files for performing over-the-air upgrades of wireless mobile stations. In particular, there is a need for a delta-file generation method that provides an optimum balance between the size of a delta file and the time required to generate the delta file. More particularly, there is a need for an improved linker that prevents the cascading of small changes in a software file into large changes in the final output executable file.

SUMMARY OF THE INVENTION

The present invention provides an improved algorithm for generating delta files in almost linear time from segments of the upgraded and original files. Thus, the algorithm of the present invention scales very well for large input files. The algorithm also exploits spatial locality of reference present in binary code (object code). The present invention may be based on the greedy algorithm (or another delta algorithm) and runs in linear time and space. The present invention also generates delta files that reduce the number of Flash memory write operations compared to other prior art algorithms.

The present invention also provides an improved linker that exploits spatial locality of reference in object code to generate better output executables. The improved linker automatically reserves spaces between object code (i.e., modules, functions) in order to accommodate future software expansion. The improved linker also analyzes previous output executables 9 i.e., the original binary file) to preserve address assignment of functions and variables, thereby minimizing changes between two successive executable files.

To address the above-discussed deficiencies of the prior art, it is a primary object of the present invention to provide a segmented linker for generating from an original binary file an upgraded binary file suitable for replacing a copy of the original binary file installed in a target device. According to an advantageous embodiment of the present invention, the segmented linker receives as inputs a plurality of objects, the original binary file, and a memory map input file associated with a target device and wherein the segmented linker preserves in the upgraded binary file at least some of the spatial locality of reference of code in the original binary file.

According to one embodiment of the present invention, the segmented linker further receives as an input a linker guideline file that defines the layout of objects having spatial locality of reference in the original binary file.

According to another embodiment of the present invention, the segmented linker uses the linker guideline file to limit the propagation of cascading address references in the upgraded binary file.

According to still another embodiment of the present invention, the segmented linker uses the linker guideline file to preserve in the upgraded binary file the order of objects having spatial locality of reference in the original binary file.

According to yet another embodiment of the present invention, the segmented linker uses the linker guideline file to reserve space between objects and modules in the upgraded binary file.

According to a still further embodiment of the present invention, the segmented linker reserves space between objects and modules in the upgraded binary file based on the number of external functions and variables outside the address space of the modules and objects.

According to a yet further embodiment of the present invention, the segmented linker reserves space between objects and modules in the upgraded binary file based on a programmer-supplied heuristic value.

In one embodiment of the present invention, the segmented linker uses information from the original binary file to preserve the address assignments of variables and functions in the upgraded binary file.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
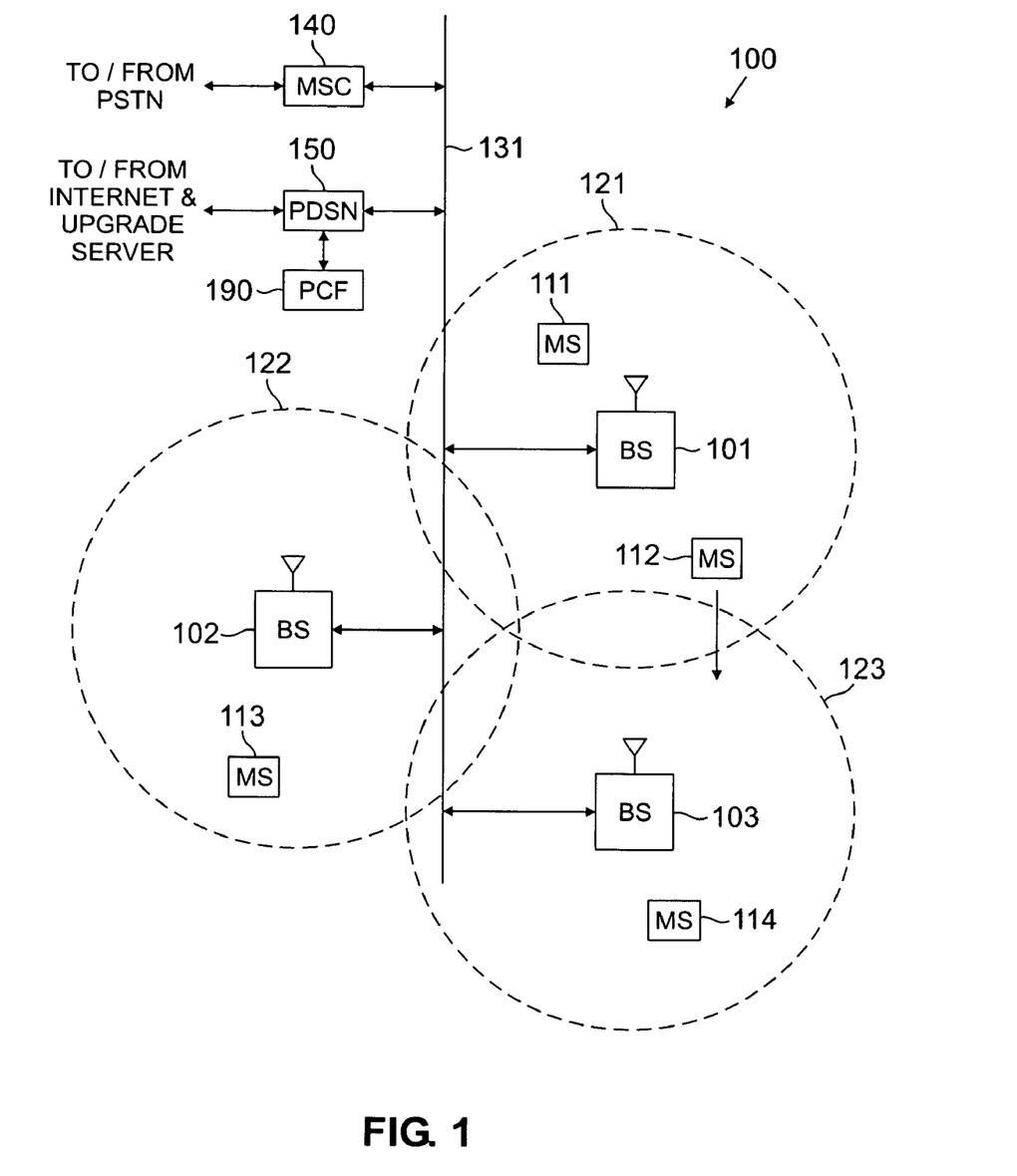
FIG. 1 illustrates an exemplary wireless network in which a space efficient delta generation algorithm may be used to upgrade mobile stations according to the principles of the present invention.

FIG. 1 illustrates exemplary wireless network 100, in which a space efficient delta generation algorithm may be used to upgrade mobile stations according to the principles of the present invention. The present invention is executed in an upgrade server (not shown) coupled wireless network 100 by means of the Internet or a similar wide area IP network. Alternatively, the upgrade server may be coupled to wireless network 100 by means of the public switched telephone network (PSTN).

Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Mobile stations 111-114 are upgraded by means of an upgrade server (not shown) that generates delta files according to the principles of the present invention. The space-efficient delta files are transferred from the upgrade server to base stations 101-103 and are then transmitted over-the-air to mobile stations 111-114.

Figure 2:
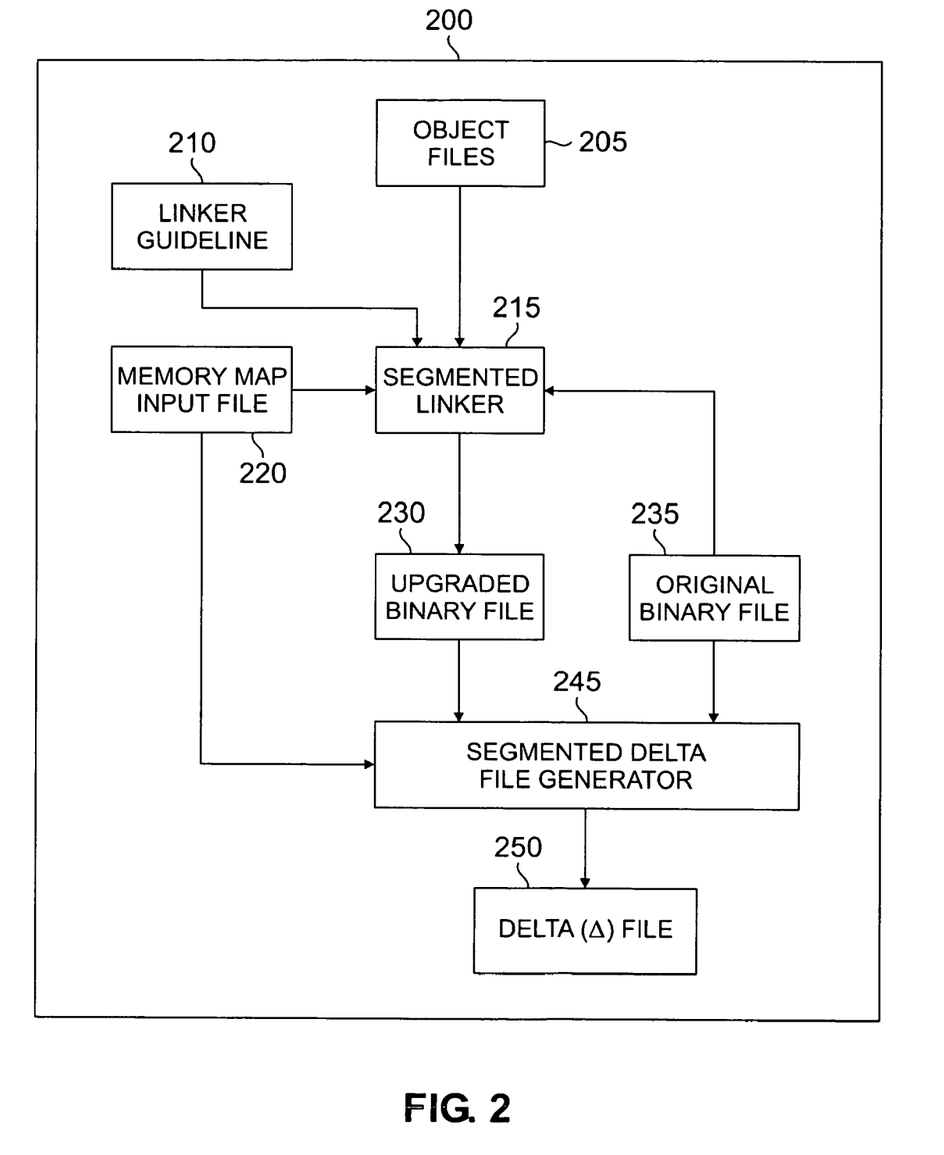
FIG. 2 illustrates selected portions of an upgrade server according to the principles of the present invention.

FIG. 2 illustrates selected portions of upgrade server 200 according to the principles of the present invention. Upgrade server 200 comprises object files 205, linker guidelines 210, segmented linker 215, memory map input file 220, upgraded (or new) binary file 230, original (or old) binary file 235, segmented delta file generator 245, and delta (Δ) file 250. Segmented linker 215 is an application program that takes object files 205, libraries and address details as inputs and generates an executable file, namely upgraded binary file 230. As will be discussed in greater detail below, in an advantageous embodiment of the present invention, segmented linker 215 may also use memory map input file 220 and linker guideline file 210 as additional inputs to produce executable upgraded binary file 230 based on spatial locality of reference in software.

According to the principles of the present invention, segmented delta file generator 245 generates delta files in a time and space efficient manner by segmenting each one of upgraded binary file 230 and original upgrade file 235 into a plurality of segments. Segmented delta file generator 245 then generates a plurality of delta files from the corresponding segments from upgraded binary file 230 and original upgrade file 235. Segmented delta file generator 245 then combines the plurality of delta files thus produced into a composite delta file (or macro-delta file) that is transmitted to mobile stations 111-114.

In order to accomplish the foregoing, segmented delta file generator 245 uses memory map input file 220 as an input in order to determine how to segment the delta files. Memory map input file 220 is commonly used by a linker program, such as segmented linker 215, to generate an executable file from object files. Memory map input file 220 defines how the memory space of a target device (in this case, a mobile station) is utilized. Thus, for example, memory map input file 220 defines the address space of Flash memory and random access memory (RAM) in mobile station 111 and defines, for example, the locations of data files, programs, boot ROM, free space, and stack boundaries.

While memory map input file 220 is normally used by a linker to create an executable file from object files and to safely store it in memory in the target device without overwriting other necessary files, segmented delta file generator 245 also uses memory map input file 220 to produce segmented delta files according to the principles of the present invention. The segmented delta files may then be combined into a composite delta file (or macro-delta file) and a cyclic redundancy check (CRC) field may be added to verify the data contained in the composite delta file. As explained previously, the time required to generate a delta file according to the prior art greedy algorithm grows exponentially as the combined size of the upgraded and original files grows. According to the principles of the present invention, segmenting the upgraded and original files and then generating segmented delta files requires much less processing time than generating a single delta file directly from the entire upgraded and original files. The trade-off of the present invention is that the composite delta files produced by the present invention are somewhat larger than the minimum sized delta file produced by a conventional greedy algorithm operating on the full-sized upgraded and original files.

Figure 3:
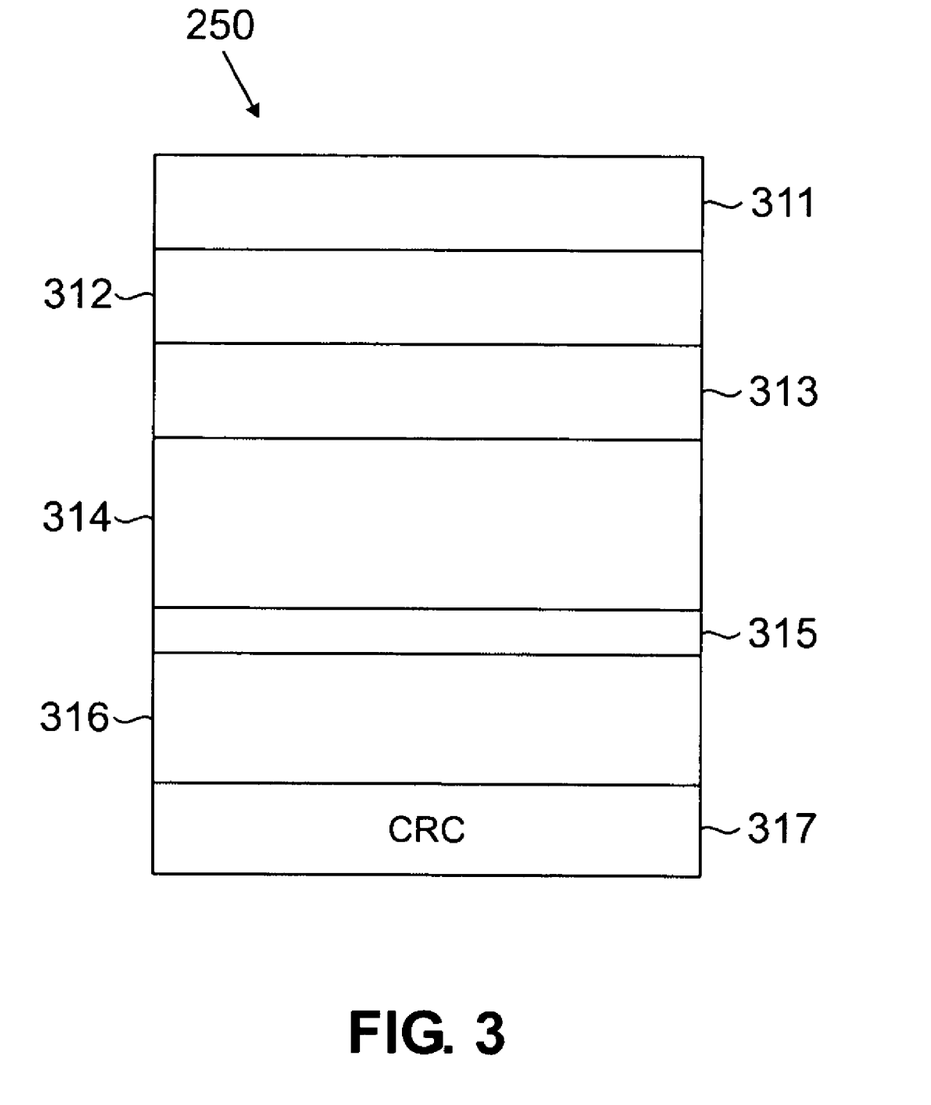
FIG. 3 illustrates a composite delta file according to an exemplary embodiment of the present invention.

FIG. 3 illustrates exemplary composite delta file 250 according to an exemplary embodiment of the present invention. Composite delta file 250 comprises individual delta files 311-316 and CRC field 317. Each one of delta files 311-316 is produced from one segment of upgraded binary file 230 and one segment from original binary file 235. After segmented delta file generator 245 generates delta files 311-316, segmented delta file generator 245 calculates a CRC value across all of delta files 311-316 and appends the calculated CRC value to delta files 311-316 in CRC field 317. Composite delta file 250 is then transmitted to mobile stations 111-114.

Figure 4:
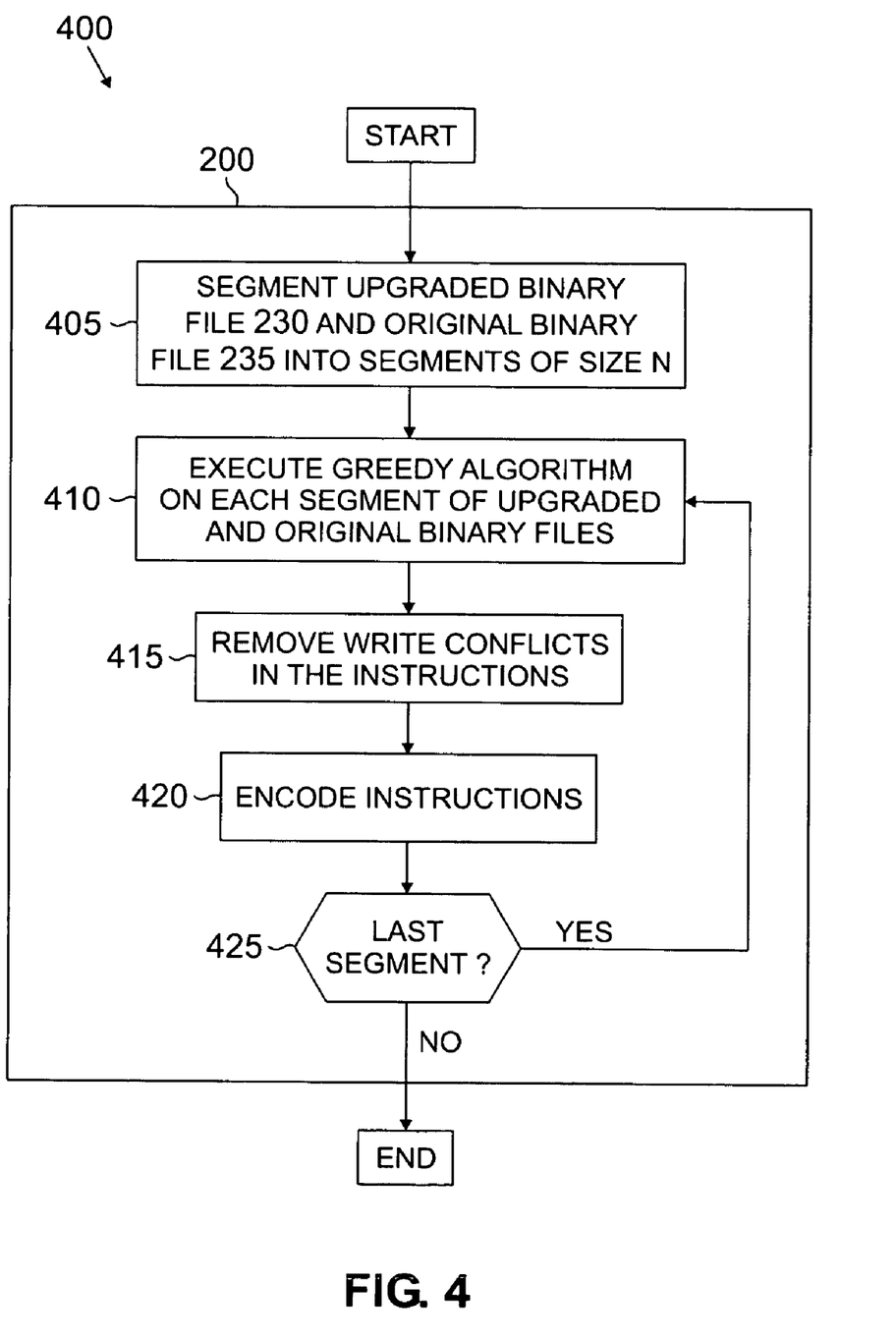
FIG. 4 is a flow diagram illustrating the new algorithm for generating delta files according to the principles of the present invention.

FIG. 4 depicts flow diagram 400, which illustrates the new algorithm for generating delta files according to the principles of the present invention. Initially, segmented delta file generator 245 divides original (old) binary file 235 and upgraded (new) binary file 230 into segments of size N (process step 405). According to an advantageous embodiment of the present invention, segmented delta file generator 245 determines the value of N according to the Flash sector sizes of the memory in mobile stations 111-114. Segmented delta file generator 245 determines the Flash sector size according to the information in memory map input file 220.

Next, for each segment (beginning with 0), segmented delta file generator 245 runs a conventional delta generation algorithm, such as the greedy algorithm, to compute delta instructions and data for each segment (process step 410). Segmented delta file generator 245 removes write conflicts in the delta instructions, so that the delta file can be applied in-place on the target mobile station (process step 415). Next, segmented delta file generator 245 encodes the delta file instructions and data (process step 420). S segmented delta file generator 245 repeats process steps 410, 415 and 420 until all segments of original binary file 235 and upgraded binary file 230 are processed (process step 425).

The present invention exploits spatial coherence in original binary file 235 and upgraded binary file 230, since blocks of code often are mostly identical at the same offsets in two related binary files. In other words, two comparable versions of the same software normally exhibit a high degree of similarity at similar offsets in code. Although the present invention may calculate deltas by applying the well-known "greedy algorithm" (by Reichenberger). Other well-known algorithms may be used. The present invention provides improvements over the greedy algorithm while still retaining much of the theoretically optimal delta file size benefits. By doing COPY and ADD delta instructions together at the end of each segment, the number of flash write operations is minimized. Conventional delta patch algorithms require a two-pass approach to handle COPY and ADD instructions separately. Since the present invention has almost linear resource requirements (memory and time), large binaries (i.e., >4 MB) run in a deterministic amount of time.

The quality of the delta files produce by segmented delta file generator 245 is further improved by the use of a segmented linker (or a smart linker) according to the principles of the present invention. The present invention adds additional intelligence to segmented link 215 to preserve spatial locality of reference between original binary file 235 and upgraded binary file 230. This is done primarily to limit the propagation of cascading address references.

In addition to receiving object files 205, memory map input file 220, upgraded binary file 230 and original binary file 235 as inputs, segmented linker 215 also receives linker guideline file 210 as an additional input. According to an advantageous embodiment of the present invention, linker guideline file 210 comprises a script describing the layout of objects that have spatial locality of reference. Segmented linker 215 uses the linker guideline file 210 to preserve the order specified by the software programmer.

In addition, segmented linker 215 uses linker guideline file 210 to reserve space between objects and modules (including functions). These reserved areas may be referred to as "holes". Segmented linker 215 calculates the reserved space based on the amount of non-local symbol references, namely the number of external functions and variables that are outside the module (or object code). Only segmented linker 215 has knowledge of the number and type of non-local references. Thus, segmented linker 215 exploits this information to produce a better output executable file (i.e., upgraded binary file 230).

The amount of reserved space (or holes) can also be modified by a programmer-supplied heuristic that accommodates future changes to those functions/object files. Thus, if the software is modified in the future, due to a bug fix, for example, the hole space will ensure that the changing addresses of functions and variables in a particular module do not cascade into another module. Segmented linker 215 also examines the previous output executable (i.e., original binary file 235) in order to preserve the same address assignments to variables and functions. This further reduces cascading changes.

As a result, segmented linker 215 produces a binary output file (i.e., upgraded binary file 230) that is ideally suited for FOTA applications, because differences between two successive executables, such as upgraded binary file 230 and original binary file 235, will tend to be relatively small. Thus, the size of the delta file generated by segmented delta file generator 245 (or any other conventional delta file generator) is minimized.

Although the present invention has been described with an exemplary embodiment, various changes and modifications may be suggested to one skilled in the art. It is intended that the present invention encompass such changes and modifications as fall within the scope of the appended claims.

What is claimed is:

1. A segmented linker executing on an upgrade server, the segmented linker for generating from an original binary file an upgraded binary file suitable for replacing a copy of the original binary file installed in a target device, wherein the segmented linker receives as inputs a plurality of objects, the original binary file, and a memory map input file associated with a target device, and wherein the segmented linker uses the memory map input file to produce two or more segmented delta files and wherein the segmented linker preserves in the upgraded binary file at least some of the spatial locality of reference of code in the original binary file and wherein the segmented linker further receives as an input a linker guideline file that defines the layout of objects having spatial locality of reference in the original binary file and uses the linker guideline file to limit the propagation of cascading address references in the upgraded binary file.

2. The segmented linker as set forth in claim 1, wherein the segmented linker uses the linker guideline file to preserve in the upgraded binary file the order of objects having spatial locality of reference in the original binary file.

3. The segmented linker as set forth in claim 2, wherein the segmented linker uses the linker guideline file to reserve space between objects and modules in the upgraded binary file.

4. The segmented linker as set forth in claim 3, wherein the segmented linker reserves space between objects and modules in the upgraded binary file based on the number of external functions and variables outside the address space of the modules and objects.

5. The segmented linker as set forth in claim 4, wherein the segmented linker reserves space between objects and modules in the upgraded binary file based on a programmer-supplied heuristic value.

6. The segmented linker as set forth in claim 5, wherein the segmented linker uses information from the original binary file to preserve the address assignments of variables and functions in the upgraded binary file.

7. The segmented linker as set forth in claim 6, wherein the segmented linker uses the memory map input file to reserve space between objects and modules in the upgraded binary file.

8. The segmented linker as set forth in claim 7, wherein the segmented linker determines from the memory map input file a sector size of a Flash memory associated with a target device and uses the sector size to reserve space between objects and modules in the upgraded binary file.

9. For use in a segmented linker, a method of generating from an original binary file an upgraded binary file suitable for replacing a copy of the original binary file installed in a target device, the method comprising the steps of: receiving in the segmented linker as inputs:

i) a plurality of objects, ii) the original binary file, and iii) a memory map input file associated with a target device; and generating two or more segmented delta files using the memory map input file and wherein the segmented linker further receives as an input a linker guideline file that defines the layout of objects having spatial locality of reference in the original binary file and using the linker guideline file to limit the propagation of cascading address references in the ungraded binary file.

10. The method of generating the upgraded binary file as set forth in claim 9, further comprising the step of using the linker guideline file to preserve in the upgraded binary file the order of objects having spatial locality of reference in the original binary file.

11. The method of generating the upgraded binary file as set forth in claim 10, further comprising the step of using the linker guideline file to reserve space between objects and modules in the upgraded binary file.

12. The method of generating the upgraded binary file as set forth in claim 11, further comprising the step of using the linker guideline file to reserve space between objects and modules in the upgraded binary file.

13. The method of generating the upgraded binary file as set forth in claim 12, wherein the step of using the linker guideline file to reserve space comprises the sub-step of reserving space between objects and modules in the upgraded binary file based on the number of external functions and variables outside the address space of the modules and objects.

14. The method of generating the upgraded binary file as set forth in claim 13, wherein the step of using the linker guideline file to reserve space comprises the sub-step of reserving space between objects and modules in the upgraded binary file based on a programmer-supplied heuristic value.

15. The method of generating the upgraded binary file as set forth in claim 14, further comprising the step of using the memory map input file to reserve space between objects and modules in the upgraded binary file.

16. The method of generating the upgraded binary file as set forth in claim 15, further comprising the steps of:

determining from the memory map input file a sector size of a Flash memory associated with a target device; and using the sector size to reserve space between objects and modules in the upgraded binary file.

* * * * *

UNITED STATES PATENT AND TRADEMARK OFFICE
CERTIFICATE OF CORRECTION

| | | |
|---|---|---|
| PATENT NO. | : 7,673,300 B2 | Page 1 of 1 |
| APPLICATION NO. | : 11/125663 | |
| DATED | : March 2, 2010 | |
| INVENTOR(S) | : Sudhindra P. Herle et al. | |

It is certified that error appears in the above-identified patent and that said Letters Patent is hereby corrected as shown below:

Column 10, claim 9, line 23, delete "ungraded" and replace with --upgraded--.

Signed and Sealed this
Seventeenth Day of May, 2011

David J. Kappos
*Director of the United States Patent and Trademark Office*